United States Patent
Bürger et al.

(10) Patent No.: US 11,958,266 B2
(45) Date of Patent: Apr. 16, 2024

(54) CLAD 2XXX-SERIES AEROSPACE PRODUCT

(71) Applicant: ALERIS ROLLED PRODUCTS GERMANY GMBH, Koblenz (DE)

(72) Inventors: Achim Bürger, Hoehr-Grenzhausen (DE); Sabine Maria Spangel, Koblenz (DE); Philippe Meyer, Agnetz (FR)

(73) Assignee: NOVELIS KOBLENZ GMBH, Koblenz (DE)

( * ) Notice: Subject to any disclaimer, the term of this patent is extended or adjusted under 35 U.S.C. 154(b) by 0 days.

(21) Appl. No.: 17/996,682

(22) PCT Filed: Apr. 28, 2021

(86) PCT No.: PCT/IB2021/053526
§ 371 (c)(1),
(2) Date: Oct. 20, 2022

(87) PCT Pub. No.: WO2021/220188
PCT Pub. Date: Nov. 4, 2021

(65) Prior Publication Data
US 2023/0191749 A1    Jun. 22, 2023

(30) Foreign Application Priority Data
Apr. 29, 2020    (EP) .................... 20172082

(51) Int. Cl.
*B32B 15/00*      (2006.01)
*B21B 1/38*       (2006.01)
(Continued)

(52) U.S. Cl.
CPC .............. *B32B 15/016* (2013.01); *B21B 1/38* (2013.01); *C22C 21/12* (2013.01); *C22C 21/16* (2013.01); *C22F 1/057* (2013.01)

(58) Field of Classification Search
None
See application file for complete search history.

(56) References Cited

U.S. PATENT DOCUMENTS

2008/0210349 A1*  9/2008  Khosla .................... C22C 21/16
                                                          148/552
2010/0089502 A1   4/2010  Zhuang et al.
(Continued)

FOREIGN PATENT DOCUMENTS

| EP | 0623462 | * | 11/1994 |
| EP | 1170394 A2 | | 1/2002 |
| FR | 2843755 A1 | | 2/2004 |

OTHER PUBLICATIONS

European Application No. 20172082.8, "Intention to Grant", dated Mar. 2, 2023, 5 pages.
(Continued)

*Primary Examiner* — Daniel J. Schleis
(74) *Attorney, Agent, or Firm* — Kilpatrick Townsend & Stockton LLP (57) ABSTRACT

Provided herein is a rolled composite aerospace product comprising a 2XXX-series core layer and an Al—Cu alloy clad layer coupled to at least one surface of the 2XXX-series core layer, wherein the Al—Cu alloy is an aluminium alloy comprising about 0.06% to 2.8% Cu, and preferably about 0.10% to 1.8% Cu. The rolled composite aerospace product is ideally suitable for structural aerospace parts. Also described herein is a method of manufacturing a rolled composite aerospace product.

20 Claims, 2 Drawing Sheets (51) Int. Cl.
  *B32B 15/01*  (2006.01)
  *C22C 21/12*  (2006.01)
  *C22C 21/16*  (2006.01)
  *C22F 1/057*  (2006.01)

(56)              References Cited

U.S. PATENT DOCUMENTS

2014/0356647 A1    12/2014  Takeda et al.
2014/0366999 A1    12/2014  Kamat et al.
2022/0152750 A1*    5/2022  Zhou ........................ C22F 1/04

OTHER PUBLICATIONS

"International Alloy Designations and Chemical Composition Limits for Wrought Aluminum and Wrought Aluminum Alloys", The Aluminum Association, XP003023672, Apr. 1, 2004, pp. 1-35.
European Application No. 20172082.8 , "Extended European Search Report", dated Oct. 19, 2020, 5 pages.
International Application No. PCT/IB2021/053526 , "International Search Report and Written Opinion", dated Jun. 30, 2021, 11 pages.
Japanese Application No. 2022-554260 , "Office Action", Oct. 17, 2023, 10 pages.
Canadian Application No. 3,176,141 , "Office Action", Jan. 16, 2024, 3 pages.

\* cited by examiner

CLAD 2XXX-SERIES AEROSPACE PRODUCT

CROSS-REFERENCE TO RELATED APPLICATION

This application claims the benefit of and priority to European Patent Application No. 20172082.8, filed Apr. 29, 2020, the contents of which are herein incorporated by reference in its entirety.

FIELD

Described herein is a rolled composite aerospace product comprising a 2XXX-series core layer and an aluminium alloy layer coupled to at least one surface of the 2XXX-series core layer. The rolled composite aerospace product is ideally suitable for structural aerospace parts. The present disclosure further relates to a method of manufacturing a rolled composite aerospace product.

BACKGROUND

In the aerospace industry, the AA2024-series aluminium alloy and modifications thereof are widely used as a high damage tolerant aluminium alloy, mostly in a T3 condition or modifications thereof. Products of these aluminium alloys have a relatively high strength to weight ratio and exhibit good fracture toughness, good fatigue properties, and adequate corrosion resistance.

To enhance the corrosion resistance, the AA2024-series alloy product may be provided as a composite product with on one or both sides a relative thin cladding layer. The cladding layer is usually of higher purity, which corrosion protects the AA2024 core alloy. The cladding includes essentially unalloyed aluminium. Often, reference is made to 1XXX-series aluminium alloys in general, and which include the sub-classes of the 1000-type, 1100-type, 1200-type, and 1300-type. In practice, however, the 1XXX-series aluminium alloy used for the cladding layer is rather very pure and has a composition of, Si+Fe<0.7%, Cu<0.10%, Mn<0.05%, Mg<0.05%, Zn<0.10%, Ti<0.03%, and balance aluminium.

The AA2024-series aluminium alloy clad with a LXXX-series alloy may also be anodized. Anodizing increases resistance to corrosion and wear and provides better adhesion for paint primers and adhesives than does bare metal. Anodized articles are applied in structural adhesive metal bonding such as in skin panels of a wing, horizontal tail plane, vertical tail plane, or a fuselage. A further known application comprises a sandwich structure, wherein one or more (glass) fibre reinforced layers are interposed between aluminium panels or sheets using adhesive bonding resulting in a so-called fibre metal laminate.

A disadvantage of the 1XXX-series alloy as clad layer is that these alloys are very soft and sensitive to surface damage during handling of the product. During a forming operation, this may lead to, for example, die-sticking.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein is a rolled composite aerospace product comprising a 2XXX-series core layer and an Al—Cu alloy clad layer coupled to at least one surface of the 2XXX-series core layer, wherein the Al—Cu alloy clad layer is of an aluminium alloy comprising 0.06% to 2.8% Cu. Optionally, the Al—Cu alloy clad layer is of an aluminium alloy comprising 0.10% to 1.8% Cu. Optionally, the Al—Cu alloy clad layer an aluminium alloy having a composition of, in wt. %:

| | |
|---|---|
| Cu | 0.06% to 2.8%, preferably 0.10% to 1.8%; |
| Mg | up to 1.5%, preferably 0.10% to 1.2%; |
| Mn | up to 0.5%, preferably 0.10% to 0.5%; |
| Si | up to 0.5%, preferably up to 0.3%; |
| Fe | up to 0.4%; |
| Cr | up to 0.25%; |
| V | up to 0.25%; |
| Zr | up to 0.2%; |
| Ag | up to 0.80%; |
| Zn | up to 0.3%; |
| Ti | up to 0.2%; | and
balance unavoidable impurities and aluminium.

Optionally, the Cu-content is in a range of 0.2% to 1.5%, and preferably of 0.5% to 1.6%. Optionally, the Mg-content is in a range of 0.20% to 1.2%, and preferably of 0.20% to 0.9%.

The Al—Cu aluminium alloy clad layer can optionally have a corrosion potential of −710 mV or less. Optionally, the Al—Cu alloy clad layer is coupled by means of roll bonding to the at least one surface of the 2XXX-series core layer. The Al—Cu alloy clad layer can have a thickness in the range of 1% to 20%, and preferably 1% to 10%, of the total thickness of the rolled composite aerospace product.

Optionally, the rolled composite aerospace product described herein consists of a 2XXX-series core layer and an Al—Cu alloy clad layer coupled to one surface or both surfaces of the 2XXX-series core layer. An interliner can be positioned between the 2XXX-series core layer and the Al—Cu alloy clad layer, and, optionally, the interliner is made from a different aluminium alloy than the Al—Cu alloy clad layer. In some examples, the interliner is made of a 1XXX-series aluminium alloy.

In some cases, the 2XXX-series alloy of the core layer (20) has a composition of, in wt. %, as follows:

| | |
|---|---|
| Cu | 1.9% to 7.0%, preferably 3.0% to 6.8%, more preferably 3.2% to 4.95%; |
| Mg | 0.30% to 1.8%, preferably 0.35% to 1.8%; |
| Mn | up to 1.2%, preferably 0.2% to 1.2%; |
| Si | up to 0.40%; |
| Fe | up to 0.40%; |
| Cr | up to 0.35%; |
| Zn | up to 1.0%; |
| Ti | up to 0.15%; |
| Zr | up to 0.25; |
| V | up to 0.25%; |
| Li | up to 2.0%; |
| Ag | up to 0.80%; |
| Ni | up to 2.5%; | and
balance being aluminium and impurities.

In some cases, the 2XXX-series core layer (20) is from the 2X24-series alloy. Optionally, at least the 2XXX-series core layer (20) is in a T3, T351, T39, T42, T8 or T851 temper. The rolled composite aerospace product (10) can have a total thickness of 0.8 mm to 50.8 mm, and preferably of 0.8 mm to 25.4 mm.

Optionally, the rolled composite aerospace product is an aerospace structural part and is preferably a fuselage or fuselage component.

Also described herein is a method of manufacturing a rolled composite aerospace product as described herein, comprising the steps of providing an ingot of a 2XXX-series aluminium alloy for forming the core layer of the composite aerospace product; homogenizing the ingot of the 2XXX-series aluminium alloy at a temperature in the range of 400° C. to 510° C. for at least 2 hours; providing an ingot or rolled clad liner of an Al—Cu aluminium alloy for forming an outer clad layer on the 2XXX-series core aluminium alloy; optionally homogenizing or preheating the ingot of the Al—Cu aluminium clad alloy forming an outer clad layer, preferably at a temperature in the range of at least 400° C., preferably in a range of 400° C. to 510° C., for at least 0.5 hour; roll bonding the Al—Cu aluminium alloy clad layer to the 2XXX-series core alloy to form a roll bonded product, preferably by means of hot rolling, and optionally followed by cold rolling; solution heat-treating the roll bonded product at a temperature in the range of 450° C. to 510° C.; cooling of the solution heat-treated roll bonded product to below 100° C., and preferably to ambient temperature; optionally stretching of the solution heat-treated and cooled roll bonded product; and ageing of the cooled roll bonded product.

Optionally, the method further comprises forming of the solution heat-treated and cooled roll bonded product, and optionally also being stretched, in a forming process into a predetermined shape product with a uniaxial or a biaxial curvature. In some cases, a forming step can be performed after the ageing step. Optionally, the forming step and the ageing step are combined in a forming step at elevated temperature, preferably at a temperature in a range of 140° C. to 200° C., and preferably for a time in a range of 1 to 50 hours.

Other objects and advantages of the invention will be apparent from the following detailed description of non-limiting examples and drawings.

DETAILED DESCRIPTION

As will be appreciated herein below, except as otherwise indicated, aluminium alloy and temper designations refer to the Aluminium Association designations in Aluminum Standards and Data and the Registration Records, as published by the Aluminium Association in 2018, and frequently updated, and are well known to the persons skilled in the art. The temper designations are laid down also in European standard EN515.

For any description of alloy compositions or preferred alloy compositions, all references to percentages are by weight percent unless otherwise indicated.

The term "up to" and "up to about", as employed herein, explicitly includes, but is not limited to, the possibility of zero weight-percent of the particular alloying component to which it refers. For example, up to 0.3% Zn may include an aluminium alloy having no Zn.

As used herein, the meaning of "a," "an," or "the" includes singular and plural references unless the context clearly dictates otherwise.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

For purposes herein, a sheet product or a sheet material is to be understood as a rolled product having a thickness of not less than 1.3 mm (0.05 inches) and not more than 6.3 mm (0.25 inches). For example, a sheet may have a thickness of 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, or 6.3 mm. See Aluminium Standard and Data, the Aluminium Association, Chapter 5 Terminology, 1997.

For purposes herein, a plate material or a plate product is to be understood as a rolled product having a thickness of more than 6.3 mm (0.25 inches). For example, a plate material or a plate product may have a thickness of more than 6.3 mm, more than 6.4 mm, more than 6.5 mm, more than 6.6 mm, more than 6.7 mm, more than 6.8 mm, more than 6.9 mm, more than 7.0 mm, more than 7.1 mm, more than 7.2 mm, more than 7.3 mm, more than 7.4 mm, more than 7.5 mm, more than 7.8 mm, more than 7.9 mm, more than 8.0 mm, more than 10.0 mm, more than 15.0 mm, more than 20.0 mm, more than 25.0 mm, more than 30.0 mm, more than 35.0 mm, more than 40.0 mm, more than 45.0 mm, more than 50.0 mm, or more than 100.0 mm. See Aluminium Standard and Data, the Aluminium Association, Chapter 5 Terminology, 1997.

Provided herein is a rolled aerospace product based on a 2XXX-series alloy and offering an improved balance of corrosion resistance and formability and further advantages. Specifically, described herein is a rolled composite aerospace product comprising a 2XXX-series core layer, wherein the core layer has two faces, and an Al—Cu alloy clad layer coupled to at least one surface of the 2XXX-series core layer, wherein the Al—Cu alloy clad layer is made of an aluminium alloy comprising 0.06% to 2.8% Cu, preferably 0.10% to 2.8% and more preferably 0.10% to 1.8% Cu, as it main alloying constituent.

There are several advantages of Al—Cu alloys described herein compared to 1XXX-series alloy. Al—Cu alloys having up to 2.8% Cu, and preferably up to 1.8%, makes the aluminium alloy more cathodic. By having at least 0.06% Cu, and preferably at least 0.10% Cu and more preferably at least 0.20%, the clad layer has a sufficient potential difference with the 2XXX-series core alloy to provide a very good corrosion resistance, in particular also a good intergranular corrosion resistance, to the rolled composite aerospace product.

Al—Cu alloys may have very good formability characteristics such that the rolled composite aerospace product can be formed in forming operations requiring a high degree of deformation. The formability characteristics are comparable to those of several automotive sheet aluminium alloys. The die-sticking of the clad layer to a forming die is significantly reduced or even avoided due to the increased hardness of the Al—Cu alloy cladding layer compared to a 1XXX-series clad layer. The absence of surface cracks avoids the pick-up into the surface of any forming lubricants. The absence of surface cracks also significantly increases the fatigue performance of the composite aerospace product. Also, the very good resistance against pitting corrosion improves the fatigue performance, as fatigue is common triggered by pitting initiation sites. The Al—Cu alloys have a significantly higher strength than 1XXX-series alloys resulting in a harder surface and correspondingly less surface damages, like scratches during product handling. Optionally, the Al—Cu alloy clad layer in a T3 condition has a yield strength (Rp) of more than 100 MPa.

Al—Cu alloys are amenable to anodization and exhibit suitable properties upon anodization such that there are no issues with the subsequent application of an adhesive bonding layer and/or a primer layer.

Al—Cu alloys are significantly stronger than 1XXX-series alloys such that the overall strength of the composite aerospace product is increased compared to a 1XXX-series alloy of the same clad layer thickness. The strength properties also allow for the design of composite aerospace products having a thinner clad thickness while resulting in weight savings and still providing the required good corrosion resistance and improved formability characteristics, or alternatively to maintain the same thickness while reaching higher overall strength.

Also, the recycling of industrial sized scrap of the rolled composite aerospace product does not lead to any major issues as the 2XXX-series alloy has purposive additions of Cu, and may have purposive additions of Mn and Mg. Roll bonded products can be remolten without prior separation of the cladding layer(s) from the core layer and can be processed to new 2XXX-series aluminium alloy products.

Optionally, the Al—Cu aluminium alloy clad layer is bonded to the 2XXX-series core layer by means of roll bonding, and preferably by means of hot rolling, to achieve the required metallurgical bonding between the layers. Such a roll bonding process is very economical and results in a very effective composite product presenting the desired properties. When carrying out such a roll-bonding process for producing the rolled composite product as described herein, it is preferred that both the core layer and the Al—Cu aluminium alloy clad layer(s) are subjected to a thickness reduction during the roll bonding. Typically, prior to rolling, in particular prior to hot rolling, the rolling faces of ingots of both the core layer and the clad layer(s) are scalped in order to remove segregation zones near the as-cast surface of the rolling ingot and to increase product flatness.

Preferably, a cast ingot or slab of the 2XXX alloy core layer is homogenized prior to hot rolling and/or it may be preheated followed directly by hot rolling. The homogenisation and/or preheating of 2XXX-series alloys prior to hot rolling is usually carried out at a temperature in the range of about 400° C. to 505° C. in single or in multiple steps. In either case, the segregation of alloying elements in the material as-cast is reduced and soluble elements are dissolved. If the treatment is carried out below about 400° C., the resultant homogenization effect is inadequate. If the temperature is above about 505° C., melting of phases might occur resulting in undesirable pore formation. The preferred time of this heat treatment is between about 2 and 30 hours. Longer times are not normally detrimental. Homogenization is usually performed at a temperature above about 480° C. A typical preheat temperature is in the range of about 430° C. to 460° C. with a soaking time in a range of up to about 15 hours.

The Al—Cu aluminium clad alloy can be provided as an ingot or slab for fabrication into rolling feedstock using semi-continuous casting techniques for cast products, e.g. direct chill casting (DC-casting), electromagnetic casting (EMC-casting), electromagnetic stirring casting (EMS-casting), and preferably having an ingot thickness in a range of about 300 mm or more, e.g., 500 mm or 600 mm. Optionally, thinner gauge slabs resulting from continuous casting, e.g., belt casters or roll casters, also may be used to provide the Al—Cu aluminium alloy clad liner feedstock. Such thinner gauge slabs can have a thickness of up to about 40 mm.

In some examples, the cast ingot or slab forming the Al—Cu aluminium alloy clad layer is preferably preheated or homogenized at a temperature of at least 400° C., and preferably at least about 450° C., prior to hot rolling in single or multiple rolling steps to thinner gauge forming a rolled clad liner. To avoid melting of phases resulting in possible undesirable pore formation within the ingot, the temperature should not be too high and should typically not exceed 510° C., and preferably not exceeding 505° C. The time at temperature for a large commercial size ingot should be at least about 0.5 hours and can be about 1 to 30 hours. A longer period, for example 48 hours or more, has no immediate adverse effect on the desired properties, but is economically unattractive. The homogenization or preheat results in a more homogeneous microstructure with dissolution of phases and with reduced segregation profiles of elements, thereby improving the formability of the alloy for the hot rolling process.

The rolled composite aerospace product is down-gauged to final gauge by means of hot rolling and optionally followed by cold rolling. After the rolled composite product is rolled to final gauge, the rolled composite product is solution heat treated at a temperature in the range of about 450° C. to 510° C. for a time sufficient for solution effects to approach equilibrium, with typical soaking times in the range of about 5 minutes to 120 minutes. Preferably, the solution heat-treatment is at a temperature in the range of about 475° C. to 510° C., for example at about 495° C. The solution heat-treatment (SHT) is typically carried out in a batch furnace or in a continuous furnace. Preferred soaking times at the indicated temperature are in the range of about 5 minutes to 35 minutes. However, with clad products, care should be taken against too long soaking times since in particular too much copper from the 2XXX core layer may diffuse into the aluminium alloy clad layer(s) which can detrimentally affect the corrosion protection afforded by said layer(s). A continuous SHT operation reduces the formation of so-called stretcher strain markings in comparison to batch annealing. A continuous SHT requires a rapid heat-up of the moving roll bonded product, wherein the average heat-up rate is more than 5° C./sec, and preferably more than 10° C./sec. After solution heat treatment, it is important that the composite product is cooled sufficiently fast to a temperature of 175° C. or lower, preferably to about 100° C. or lower, and more preferably to ambient temperature, to prevent or minimize the uncontrolled precipitation of secondary phases, e.g. Al₂CuMg and Al₂Cu. On the other hand, cooling rates should not be too high to allow for a sufficient flatness and low level of residual stresses in the composite product. Suitable cooling rates can be achieved with the use of water, e.g., water immersion or water jets. The solution heat-treatment in this temperature range followed by fast cooling results in a supersaturated microstructure. The composite product may be further cold worked, for example, by stretching up in the range of about 0.5% to 8% of its original length in order relieve residual stresses therein and to improve the flatness of the product. Preferably, the stretching up is in the range of about 0.5% to 6%, more preferably of about 0.5% to 4%, and most preferably of about 0.5% to 3%.

After cooling, the rolled composite aerospace product is naturally aged, typically at ambient temperatures, and alternatively the composite aerospace product can also be artificially aged. Artificial ageing during this process step can be of particular use for higher gauge products.

In an embodiment, the composition of the Al—Cu aluminium alloy clad layer is tuned such that it has an open potential corrosion value (vs. Standard Calomel Electrode (SCE), also referred to as "corrosion potential") of −710 mV or less (for example, −750 mV) to provide optimum corrosion protection to the 2XXX-series core alloy, and measured in a solution heat-treated and fast cooled material in a solution of 53 g/L NaCl plus 3 g/L H₂O₂ at 25° C. with a 0.1 N calomel electrode. In a preferred embodiment, the corrosion potential of the Al—Cu aluminium alloy clad layer is in a range of −730 mV to −800 mV, measured after SHT and fast cooling, thus when the key alloying elements are largely in solid solution.

In an embodiment, the corrosion potential difference between the 2XXX core layer and the Al—Cu aluminium alloy clad layer, i.e., in the final temper, is in a range of 30 mV to 100 mV to provide sufficient corrosion protection from the anodic clad layer to the core layer.

The Al—Cu aluminium alloy clad layer or layers are usually much thinner than the core, each Al—Cu aluminium alloy layer constituting 1% to 20% of the total composite thickness. An Al—Cu alloy clad layer more preferably constitutes around 1% to 10% of the total composite thickness.

In an embodiment, the Al—Cu aluminium alloy clad layer is bonded on one surface or one face of the 2XXX-series core layer.

In an embodiment, the Al—Cu aluminium alloy clad layer is bonded on both surfaces or both faces of the 2XXX-series core layer forming an outer surface of the rolled composite aerospace product.

In an embodiment, an interliner or interlayer is positioned between the 2XXX-series core layer and the Al—Cu aluminium alloy clad layer, and wherein the interliner is made from a different aluminium alloy than the Al—Cu aluminium layer. In some cases, such an aluminium alloy for the interliner can be a 1XXX-series alloy. This interliner acts as a further diffusion barrier of Cu from the core alloy to the outer surface layer formed by the Al—Cu aluminium alloy. It allows for the creating of a difference in Cu content between the various layers and creating a Cu-gradient and thereby providing increased galvanic protection to the 2XXX-series core alloy and enhancing the pitting and intergranular corrosion resistance of the 2XXX-series core alloy by preferential interliner corrosion, while the hardness and surface characteristics provided by the Al—Cu aluminium alloy outer-layer are maintained. The interliner is preferably also roll bonded to the core alloy. Each interliner constitutes 1% to 20% of the total composite aerospace product thickness, and preferably constitutes around 1% to 10% of the total composite aerospace product thickness.

In an embodiment, the rolled composite aerospace product has a total thickness of at least 0.8 mm.

In an embodiment, the rolled composite aerospace product has a total thickness of at most 50.8 mm (2 inches), and preferably of at most 25.4 mm (1 inch), and most preferably of at most 12 mm.

Optionally, the rolled composite aerospace product is a plate product.

Optionally, the rolled composite aerospace product is a sheet product.

The Al—Cu aluminium alloy clad layer has a Cu-content in a range of 0.06% to 2.8%. In an embodiment, the upper-limit for the Cu-content is about 1.8% and preferably about 1.6%. In an embodiment, the lower-limit for the Cu-content is preferably 0.10%, more preferably 0.20%, and most preferably 0.50%, to provide optimum corrosion protection to the core alloy. The Cu-content provides strength to the aluminium alloy clad layer and allows the tune the corrosion potential to the target range and to control the intergranular corrosion resistance to an acceptable level for use as an aerospace component.

Optionally, the Cu content in the clad layer can be from about 0.06% to 2.8% (0.1% to 2.5%, 0.1% to 1.8%, 0.5% to 2.0%, 0.5% to 1.6%, or 1.0% to 1.9%). Optionally, the Cu content in the clad layer can be about 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 25%, 2.6%, 2.7%, or 2.8%.

In an embodiment, the Al—Cu aluminium alloy clad layer is from an aluminium alloy having a composition comprising, in wt. %:

| | |
|---|---|
| Cu | 0.06% to 2.8%, preferably 0.10% to 1.8%, more preferably 0.50% to 1.6%; |
| Mg | up to 1.5%, preferably 0.10% to 1.2%, more preferably 0.2% to 0.9%; |
| Mn | up to 0.5%, preferably 0.10% to 0.5%; |
| Si | up to 0.5%, preferably up to 0.3%; |
| Fe | up to 0.4%, preferably up to 0.3%; |
| Cr | up to 0.25%; |
| V | up to 0.25%; |
| Zr | up to 0.2%; |
| Ag | up to 0.80%, preferably up to 0.40%, more preferably up to 0.10%; |
| Zn | up to 0.3%, preferably up to 0.15%; |
| Ti | up to 0.2%; | balance unavoidable impurities and aluminium. Preferably unavoidable impurities are each up to 0.05% and the total up to 0.15%.

Mg can be added to the Al—Cu aluminium alloy clad layer in a range of up to about 1.5%, and preferably up to about 1.2% to provide additional strength to the clad layer by precipitation of Al₂CuMg precipitates and/or solid solution hardening. In an embodiment the upper-limit for the Mg content is about 0.9%, and more preferably about 0.80%. A preferred lower-limit for the Mg addition is about 0.10%, and more preferably about 0.20%, and most preferably about 0.35%.

Optionally, the Mg content in the clad layer can be up to 1.5% (e.g., 0.10% to 1.2% or 0.2% to 0.9%). Optionally, the Mg content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, or 1.5%.

In an embodiment, the Mg-content is lower than the Cu-content in the Al—Cu alloy such that Cu remains the main alloying element.

Mn can be added to the Al—Cu aluminium alloy clad layer in a range of up to 0.5%, preferably up to 0.4%, to control the grain structure via the formation of dispersoids during homogenization and/or preheat prior to hot rolling and which dispersoids pin grain boundaries. A preferred lower-limit for that purpose is about 0.10%, and more preferably about 0.15%. Mn will contribute to maintaining a small grain size in the clad layer(s) providing a better surface appearance and less surface cracks after a subsequent forming operation. The presence of Mn increases the anodization quality of the outer-surface of the Al—Cu aluminium alloy clad layer as it facilitates the beta-AlFeSi phase ($Al_5FeSi$) to alpha-AlFeSi ($Al_8Fe_2Si$) transformation and stabilizes the alpha-AlFeSi phases. The presence of Mn will also favorably increase the corrosion potential of the Al—Cu aluminium alloy and the amount of Mn added can be tuned to optimize the corrosion potential difference between the 2XXX-series core alloy and the outer clad layer(s) depending on the application and thereby enhancing the corrosion resistance of the rolled composite aerospace product.

Optionally, the Mn content in the clad layer is up to 0.5% (e.g., 0.10% to 0.5% or 0.2% to 0.4%). Optionally, the Mn content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, or 0.5%.

In another embodiment the Mn-content is up to 0.2%, and preferably up to 0.15%, and more preferably up to 0.10%, such that there is no purposive addition and limits the formation of adverse coarse intermetallics in combination with the Fe presence.

Iron is a common impurity and can be present in a range of up to about 0.4%. If the Fe-content exceeds 0.4%, large Fe containing intermetallics may be formed, and a streak patterns may occur or an anodic oxide layer may become turbid due to the intermetallic compounds. In an embodiment the Fe-content is kept to a maximum of about 0.3%. In an embodiment the Fe-content is at least 0.10%.

Optionally, the Fe content in the clad layer is up to 0.4% (e.g., up to 0.3% or 0.06 to 0.35%). Optionally, the Fe content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, or 0.4%.

Silicon (Si) is a common impurity also and can be present in a range of up to about 0.5% and preferably is kept to a maximum of about 0.3%. A more preferred Si level would be in the range of up to about 0.2%. In an embodiment the Si level is at least about 0.05%, and preferably at least about 0.07% to obtain color strength and stability after anodization.

Optionally, the Si content in the clad layer is up to 0.5% (e.g., 0.10% to 0.5% or 0.15% to 0.3%). Optionally, the Si content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, or 0.5%.

Cr may be added up to 0.25% to enhance the strength of the aluminium alloy and for grain structure control. Preferably it is present up to 0.20% and more preferably up to 0.15%. In an embodiment Cr is among the unavoidable impurities.

In some cases, the Cr content in the clad layer can be up to 0.25% (e.g., up to 0.20%, up to 0.09%, up to 0.04%, from 0.05% to 0.25%, from 0.1% to 0.25%, or from 0.15% to 0.2%). Optionally, the Cr content can be 0.01%, 0.05%, 0.1%, 0.15%, 0.2%, or 0.25%.

V may be added up to 0.25% to enhance the strength of the aluminium alloy and for grain structure control. Preferably it is present up to 0.20% and more preferably up to 0.15%. In an embodiment V is among the unavoidable impurities, and preferably only up to 0.02%, and more preferably only up to 0.01%.

In some cases, the V content in the clad layer can be up to 0.25% (e.g., up to 0.20%, up to 0.09%, up to 0.04%, from 0.05% to 0.25%, from 0.1% to 0.25%, or from 0.15% to 0.2%). Optionally, the V content can be 0.01%, 0.05%, 0.1%, 0.15%, 0.2%, or 0.25%.

Ag can be present in the clad layer in an amount up to 0.80% (e.g., up to 0.40% or up to 0.15%). In some cases, the Ag content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, or 0.8%.

Zn can be present up to 0.3%, and preferably up to 0.15%, without departing from the advantages described herein. Zn makes the aluminium alloy more anodic and can be used to tune the corrosion potential to lower values. In an embodiment the aluminium alloy comprises at least 0.05% Zn. In another embodiment Zn is among the unavoidable impurities.

In some examples, the Zn content in the clad layer can be up to 0.3% (e.g., up to 0.25%, up to 0.20%, up to 0.15%, up to 0.09%, up to 0.04%, from 0.05% to 0.3%, from 0.1% to 0.25%, or from 0.15% to 0.2%). Optionally, the Zn content can be 0.01%, 0.05%, 0.1%, 0.15%, 0.2%, 0.25%, or 0.3%.

Zr may be added up to 0.2%, and preferably up to 0.1%, to control the grain structure without departing from the advantages described herein. In a preferred embodiment Zr is among the unavoidable impurities, and preferably only up to 0.02%, and more preferably only up to 0.01%. At elevated levels it may form detrimental intermetallic particles in the aluminium alloy.

In some cases, the Zr content in the clad layer can be up to 0.2% (e.g., up to 0.15%, up to 0.1%, from 0.05% to 0.2%, or from 0.05% to 0.15%). Optionally, the Zr content can be 0.01%, 0.05%, 0.1%, 0.15%, or 0.2%.

Ti is a grain refiner agent during solidification of both ingots and welded joints. Ti levels should not exceed about 0.2%, and is preferably up to 0.10%, and the more preferred range for Ti is about 0.005% to 0.07%. Ti can be added as a sole element or as is known in the art with either boron or carbon, such as $TiB_2$, Ti—C or the like, serving as a casting aid for grain size control.

In some cases, the Ti content in the clad layer can be up to 0.2% (e.g., up to 0.15%, up to 0.1%, from 0.05% to 0.2%, or from 0.05% to 0.15%). Optionally, the Ti content can be 0.01%, 0.05%, 0.1%, 0.15%, or 0.2%.

In an embodiment the Al—Cu aluminium alloy clad layer is made from an aluminium alloy having a composition consisting of, in wt. %, Cu 0.06% to 2.8%, and preferably 0.10% to 1.8%; Mg up to 1.5%; Mn up to 0.5%; Si up to 0.5%; Fe up to 0.4%; Cr up to 0.25%; V up to 0.25%; Zr up to 0.2%; Zn up to 0.3%; Ti up to 0.2%; and balance aluminium and impurities, and with preferred narrower compositional ranges as herein described and claimed.

In an embodiment the 2XXX-series core layer is from an aluminium alloy having a composition comprising, in wt. %:

| | |
|---|---|
| Cu | 1.9% to 7.0%, preferably 3.0% to 6.8%, more preferably 3.2% to 4.95%; |
| Mg | 0.30% to 1.8%, preferably 0.35% to 1.8%, more preferably 0.6% to 1.8%; |
| Mn | up to 1.2%, preferably 0.2% to 1.2%, more preferably 0.25% to 0.9%; |
| Si | up to 0.40%, preferably up to 0.25%; |
| Fe | up to 0.40%, preferably up to 0.25%; |
| Cr | up to 0.35%, preferably up to 0.10%; |
| Zn | up to 1.0%, preferably up to 0.25%; |
| Ti | up to 0.15%, preferably 0.01% to 0.10%; |
| Zr | up to 0.25, preferably up to 0.12%; |
| V | up to 0.25%; |
| Li | up to 2.0%; |
| Ag | up to 0.80%; |
| Ni | up to 2.5%; | balance being aluminium and impurities. Typically, such impurities are present each <0.05%, total <0.15%.

Optionally, the 2XXX-series core layer is from an aluminium alloy having a composition comprising, and preferably having a composition consisting of, in wt. %:

| | |
|---|---|
| Cu | 1.9% to 7.0%, preferably 3.0% to 6.8%, more preferably 3.2% to 4.95%; |
| Mg | 0.30% to 1.8%, preferably 0.6% to 1.8%, more preferably 0.8% to 1.8%; |
| Mn | up to 1.2%, preferably 0.2% to 1.2%, more preferably 0.25% to 0.9%; |
| Si | up to 0.40%, preferably up to 0.25%; |
| Fe | up to 0.40%, preferably up to 0.25%; |
| Cr | up to 0.35%, preferably up to 0.10%; |
| Zn | up to 0.4%, preferably up to 0.25%; |
| Ti | up to 0.15%, preferably 0.01% to 0.10%; |
| Zr | up to 0.25, preferably up to 0.12%; |
| V | up to 0.25%, preferably up to 0.05%; | balance being aluminium and impurities. Typically, such impurities are present each <0.05%, total <0.15%.

The Cu content in the core layer can be from 1.9% to 7.0% (e.g., 2.0% to 7.0%, 3.0% to 6.8%, 3.0% to 6.0%, or 3.2% to 4.95%). Optionally, the Cu content in the core layer can be about 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, or 7.0%.

The Mg content in the core layer can be from 0.30% to 1.8% (e.g., 0.35% to 1.8% or 0.6% to 1.8%). Optionally, the Mg content in the core layer can be about 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, or 1.8%.

The Mn content in the core layer can be up to 1.5% (e.g., 0.2% to 1.2% or 0.25% to 0.9%). Optionally, the Mn content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, or 1.2%.

The Si content in the core layer can be up to 0.4% (e.g., up to 0.3%, up to 0.25%, or 0.06 to 0.35%). Optionally, the Si content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, or 0.4%.

The Fe content in the core layer is up to 0.4% (e.g., up to 0.3%, up to 0.25%, or 0.06 to 0.35%). Optionally, the Fe content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, or 0.4%.

The Cr content in the core layer can be up to 0.35% (e.g., up to 0.20%, up to 0.10%, up to 0.09%, up to 0.04%, from 0.05% to 0.25%, from 0.1% to 0.25%, or from 0.15% to 0.2%). Optionally, the Cr content can be 0.01%, 0.05%, 0.1%, 0.15%, 0.2%, 0.25%, 0.3%, or 0.35%.

The Zn content in the core layer can be up to 1.0% (e.g., up to 0.25%, 0.10% to 1.2%, or 0.2% to 0.9%). Optionally, the Zn content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, or 1.0%.

The Ti content in the core layer can be up to 0.15% (e.g., up to 0.10%, up to 0.01%, from 0.05% to 0.2%, or from 0.05% to 0.15%). Optionally, the Ti content can be 0.01%, 0.05%, 0.1%, or 0.15%.

The Zr content in the core layer can be up to 0.25% (e.g., up to 0.15%, up to 0.12%, up to 0.1%, from 0.05% to 0.2%, or from 0.05% to 0.15%). Optionally, the Zr content can be 0.01%, 0.05%, 0.1%, 0.15%, 0.2%, or 0.25%.

The V content in the core layer can be up to 0.25% (e.g., up to 0.20%, up to 0.09%, up to 0.04%, from 0.05% to 0.25%, from 0.1% to 0.25%, or from 0.15% to 0.2%). Optionally, the V content can be 0.01%, 0.05%, 0.1%, 0.15%, 0.2%, or 0.25%.

The Li content in the core layer can be up to 2.0% (e.g., up to 1.5%, 0.10% to 1.2%, or 0.2% to 0.9%). Optionally, the Li content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, or 2.0%.

Ag can be present in the clad layer in an amount up to 0.80% (e.g., up to 0.40% or up to 0.15%). In some cases, the Ag content in the clad layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, or 0.8%.

The Ni content in the core layer can be up to 2.5% (e.g., up to 2.0%, up to 1.5%, 0.10% to 2.5%, or 0.2% to 2.0%). Optionally, the Ni content in the core layer can be about 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%.

In preferred embodiment the 2XXX-series core layer is from an AA2X24-series aluminium alloy, wherein X is equal to 0, 1, 2, 3, 4, 5, 6, 7, or 8. A particular preferred aluminium alloy is within the compositional ranges of AA2024, AA2524, and AA2624.

In an embodiment the 2XXX-series core layer, and being clad on one or both faces with an Al—Cu alloy clad layer, is provided in a T3, T351, T39, T42, T8 or T851 condition.

The 2XXX-series core layer, and being clad on one or both faces with an Al—Cu alloy clad layer, can be provided to a user in a non-solution heat treated condition, such as an "F" temper or an annealed "0" temper, and then formed and solution heat treated and aged to the required condition, e.g. a T3, T351, T39, T42, T8 or T851 temper.

Also provided is a method of manufacturing the rolled composite aerospace product described herein, the method comprising the steps of:
(a) providing an ingot or rolling feedstock of a 2XXX-series aluminium alloy for forming the core layer of the composite aerospace product;
(b) homogenizing the ingot of said 2XXX-series aluminium alloy at a temperature in the range of 400° C. to 510° C. for at least 2 hours;
(c) providing an ingot or rolled clad liner of an Al—Cu aluminium alloy for forming an outer clad layer on the 2XXX-series core aluminium alloy; optionally two ingots or two rolled clad liners of the Al—Cu aluminium alloy are provided for forming a clad layer on each side of the 2XXX-series core aluminium alloy;
(d) optionally homogenizing or preheating the ingot(s) of the Al—Cu aluminium alloy at a temperature in the range of at least about 400° C. for at least 0.5 hour, and preferably at a temperature in a range of about 400° C. to 510° C.;
(e) roll bonding of the Al—Cu aluminium alloy layer(s) to the 2XXX-series core alloy layer to form a roll bonded product, preferably by means of hot rolling and optionally followed by cold rolling;
(f) solution heat-treating the roll bonded product at a temperature in the range of about 450° C. to 510° C., either in a batch operation or a continuous operation;
(g) cooling of the solution heat-treated roll bonded product to below about 100° C. or lower, and preferably to ambient temperature;
(h) optionally stretching of the solution heat-treated roll bonded product, preferably by means of cold stretching in a range of about 0.5% to 8% of its original length, preferably in a range of about 0.5% to 6%, more preferably of about 0.5% to 4%, and most preferably of about 0.5% to 3%; and
(i) ageing of the cooled roll bonded product, by natural ageing and/or artificial ageing. In a preferred embodiment the ageing brings the 2XXX-series core layer to a T3, T351, T39, T42, T8 or T851 temper. The ageing brings the Al—Cu alloy clad layer to the same temper as the 2XXX-series core layer.

In an embodiment of the method as described herein, in a next processing steps (j) the rolled composite aerospace product is formed in a forming process, at ambient temperature or at elevated temperature, into a shaped product having at least one of a uniaxial curvature or a biaxial curvature.

In an alternative embodiment of the method, after roll bonding in step (e) of the Al—Cu aluminium alloy(s) to the 2XXX-series core alloy to form a roll bonded product, preferably by means of hot rolling and optionally followed by cold rolling, the roll bonded product is formed in a forming process, at ambient temperature or at elevated temperature, into a shaped product having at least one of a uniaxial curvature or a biaxial curvature, followed by a solution heat-treatment and subsequent ageing to a final temper.

The forming process can be by a forming operation selecting from the group of a bending operation, roll forming, stretch forming, age creep forming, deep drawing, and high-energy hydroforming, in particular by explosive forming or electrohydraulic forming.

In an embodiment the forming process or forming operation at elevated temperature is performed at a temperature in a range of about 140° C. to 200° C., and preferably the rolled composite aerospace product is kept at the forming temperature for a time in a range of about 1 to 50 hours. In a preferred embodiment the forming at elevated temperature is by means of an age creep forming operation. Age creep forming is a process or operation of restraining a component to a specific shape during ageing heat treatment, allowing the component to relieve stresses and creep to contour, for example fuselage shells with a single or double curvature.

In an embodiment it is excluded from the current disclosure that the rolled composite aerospace product described herein, after having received a solutionizing heat treatment (SHT) and prior to forming into a predetermined shape, receives a post-SHT cold working step inducing at least 25% cold work in the rolled composite aerospace product, in particular the cold working comprises cold rolling of the rolled aerospace product to final gauge, as disclosed in patent document US-2014/036699-A1 and incorporated herein by reference.

One aspect described herein relates to the use of the Al—Cu aluminium alloy as herein described and claimed as a clad layer on one or both surface of a 2XXX-series aluminium alloy to form a rolled aerospace clad product.

In a further aspect, provided herein is a welded structure comprising of a rolled composite aerospace product as described herein and at least one aluminium alloy stiffening element joined to the rolled composite aerospace product by means of riveting or a welding operation.

The present disclosure also relates to a welded structural member of an aircraft comprising of a rolled composite aerospace product as described herein and at least one aluminium alloy stiffening element, preferably a stringer, joined to the rolled composite aerospace product by means of riveting or a welding operation, for example by means of laser beam welding or by friction stir welding.

It also relates to welded fuselage structures whereby the fuselage panels are joined to each other by means of laser beam welding ("LBW") or friction stir welding ("FSW"), e.g. by means of butt welds.

The product described herein also comprises an aircraft or spacecraft, the fuselage of which is wholly or partially constructed out of the rolled composite aerospace product described herein, which may be incorporated into various structural portions of the aircraft. For example, the various disclosed embodiments may be used to form structural portions in the wing assemblies and/or structural portions in the tail assembly (empennage). The aircraft is generally representative of commercial passenger or freight aircraft. In alternative embodiments, the products described herein may also be incorporated into flight vehicles of other types. Examples of such flight vehicles included manned or unmanned military aircraft, rotary wing aircraft, or even ballistic flight vehicles.

The rolled composite aerospace product described herein can be shaped into a member for an airplane, such as a fuselage component or panel, or as a wing component or panel, and the airplane can utilize the advantage of the products as described. The shaping referred to can include bending, stretch forming, machining and other shaping operations known in the art for shaping panels or other members for aircraft, aerospace or other vehicles. Forming involving bending or other plastic deformation can be performed at room temperature or at elevated temperatures.

EXAMPLES

Figure 1:
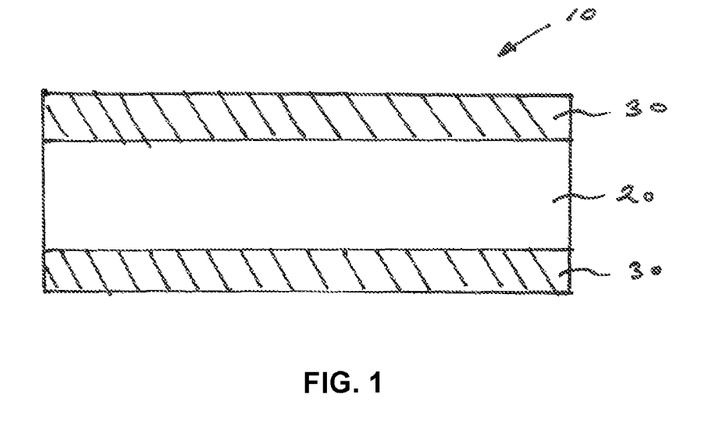
FIG. 1 is a schematic diagram of a rolled composite aerospace product as described herein.

FIG. 1 illustrates a rolled composite aerospace product 10 consisting of a three-layered structure of a 2XXX-series core alloy layer 20 having on each side an Al—Cu aluminium alloy clad layer 30 of an Al—Cu aluminium alloy as herein set forth and claimed. In another embodiment, the 2XXX-series core alloy is clad only on one side or one face with an Al—Cu aluminium alloy clad liner.

Figure 2:
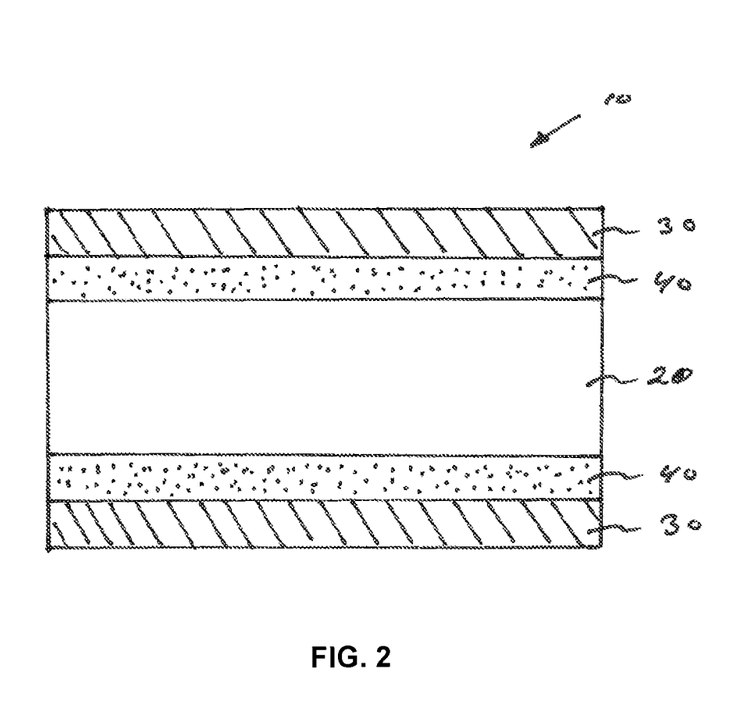
FIG. 2 is a schematic diagram of a rolled composite aerospace product having five distinct layers as described herein.

FIG. 2 illustrates a rolled composite aerospace product 10 having a five-layered structure consisting of a 2XXX-series core alloy layer 20 having on each side a Al—Cu aluminium alloy clad layer 30 as herein set forth and claimed, and wherein another and different aluminium alloy interliner or clad layer 40 is interposed between the core alloy layer 20 and the Al—Cu aluminium alloy clad layer 30 such that the Al—Cu aluminium alloy clad layer 30 forms the outer layer of the rolled composite aerospace product 10. In an embodiment the interliner or clad layer 40 is made of an aluminium alloy from the 1XXX-series aluminium alloys.

Figure 3:
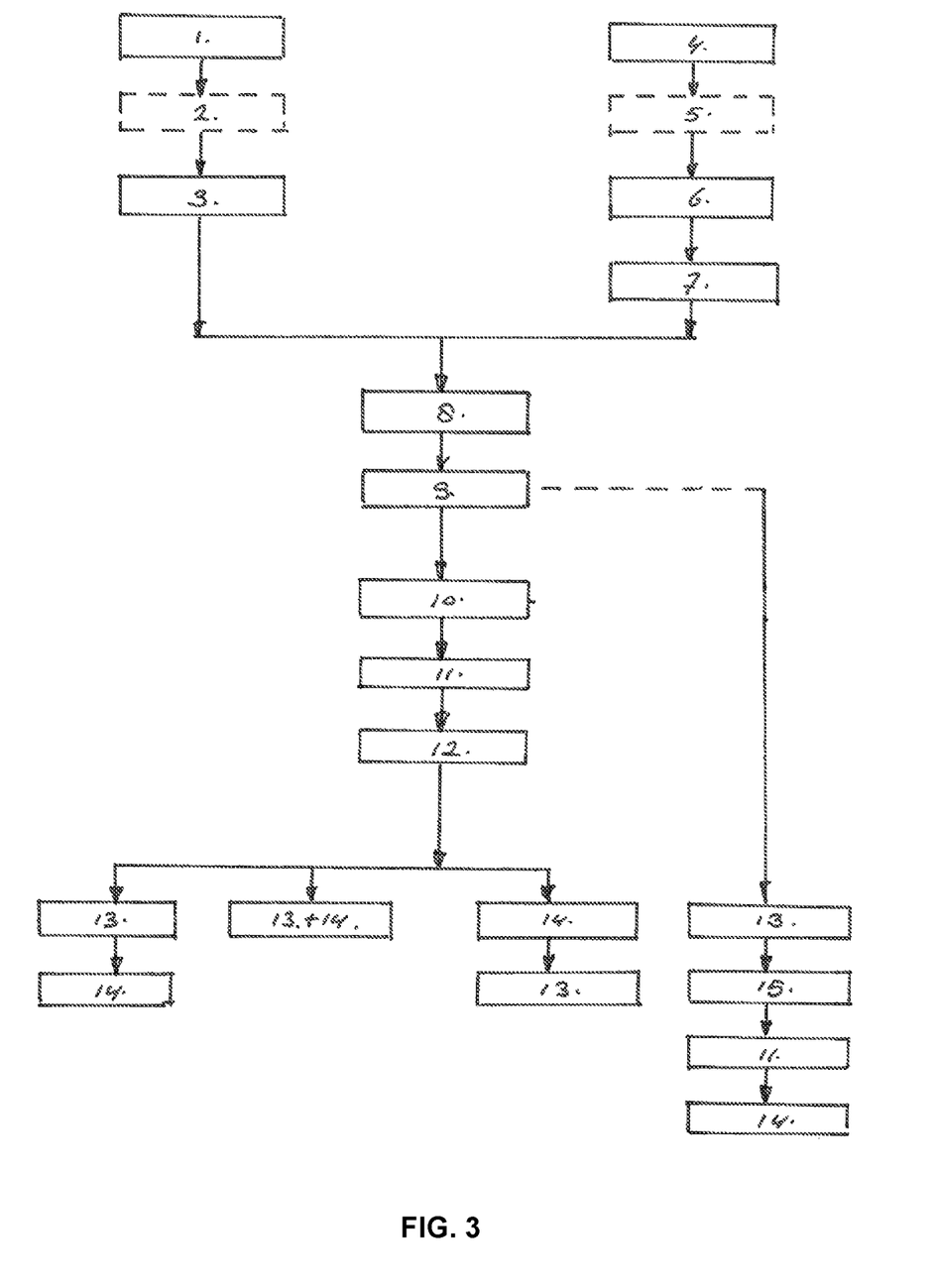
FIG. 3 is a schematic flow schedule of several embodiments of the process to manufacture a rolled composite aerospace product as described herein.

FIG. 3 is a schematic flow schedule of several embodiments of the process described herein to manufacture a rolled composite aerospace product. In process step 1, an ingot is cast of a 2XXX-series alloy forming the core alloy of the composite aerospace product, which optionally can be scalped in step 2 to remove segregation zones near the as-cast surface of the rolling ingot and to increase product flatness. In process step 3, the rolling ingot is homogenized. In parallel in process step 4, an ingot is cast of an Al—Cu aluminium alloy for forming at least one clad layer on a surface of the core alloy of the composite aerospace product, and optionally on both faces of the core alloy. Also this ingot optionally can be scalped in step 5. In process step 6, the Al—Cu alloy is pre-heated to the hot rolling start temperature and subsequently, in process step 7, hot rolled to form liner plate(s) as the clad layer is usually much thinner than the core. In process step 8, the 2XXX core alloy and an Al—Cu aluminium alloy liner plate on one or both sides of the core alloy are roll bonded, preferably by means of hot rolling. Depending on the desired final gauge, the roll bonded product can be cold rolled in process step 9 to final gauge, for example to a sheet product or a thin gauge plate product. In a process step 10, the rolled aerospace product is solution heat treated, next cooled in process step 11, and preferably stretched in process step 12.

In an embodiment, the cooled product is formed in forming process 13 and ageing, i.e., natural or artificial ageing, in process step 14 to final temper, e.g., a T3 or T8 temper.

In an embodiment, the forming process 13 and the ageing of process step 14 can be combined. For example, the forming operation is performed at a temperature in a range of about 140° C. to 200° C., and preferably for a time in a range of about 1 to 50 hours, such that also artificial ageing of both the 2XXX-series core and the Al—Cu alloy clad layer(s) occurs.

In an embodiment, the cooled product is aged in process step 14, i.e., natural or artificial ageing, to a desired temper, and subsequently formed in a forming process 13 into a formed product of predetermined shape.

In an alternative embodiment, after rolling bonding of the 2XXX-series core and the Al—Cu aluminium alloy clad layer(s) to final gauge, the rolled product is formed in a forming process 13 into a predetermined shape, solution heat treated in process step 15, and cooled in process step 11, followed by ageing, i.e., natural or artificial ageing, in process step 14 to final temper, e.g. a T3 or T8 temper.

Illustrations

Illustration 1 is a rolled composite aerospace product comprising a 2XXX-series core layer and an Al—Cu alloy clad layer coupled to at least one surface of the 2XXX-series core layer, wherein the Al—Cu alloy clad layer is of an aluminium alloy comprising 0.06% to 2.8% Cu.

Illustration 2 is the rolled composite aerospace product according to any preceding or subsequent illustration, wherein the Al—Cu alloy clad layer is of an aluminium alloy comprising 0.10% to 1.8% Cu.

Illustration 3 is the rolled composite aerospace product according to any preceding or subsequent illustration, wherein the Al—Cu alloy clad layer an aluminium alloy having a composition of, in wt. %:

| | |
|---|---|
| Cu | 0.06% to 2.8%; |
| Mg | up to 1.5%; |
| Mn | up to 0.5%; |
| Si | up to 0.5%; |
| Fe | up to 0.4%; |
| Cr | up to 0.25%; |
| V | up to 0.25%; |
| Zr | up to 0.2%; |
| Ag | up to 0.80%; |
| Zn | up to 0.3%; |
| Ti | up to 0.2%; | and balance unavoidable impurities and aluminium.

Illustration 4 is the rolled composite aerospace product according to any preceding or subsequent illustration, wherein the Cu-content is in a range of 0.2% to 1.5%.

Illustration 5 is the rolled composite aerospace product according to any preceding or subsequent illustration, wherein the Mg-content is in a range of 0.20% to 1.2%.

Illustration 6 is the rolled composite aerospace product according to any preceding or subsequent illustration, wherein the Al—Cu aluminium alloy clad layer has a corrosion potential of −710 mV or less.

Illustration 7 is the rolled composite aerospace product according to any preceding or subsequent illustration, wherein the Al—Cu alloy clad layer is coupled by means of roll bonding to the at least one surface of the 2XXX-series core layer.

Illustration 8 is the rolled composite aerospace product according to any preceding or subsequent illustration, wherein the Al—Cu alloy clad layer has a thickness in the range of 1% to 20% of the total thickness of the rolled composite aerospace product.

Illustration 9 is the rolled composite aerospace product according to any preceding or subsequent illustration, consisting of a 2XXX-series core layer and an Al—Cu alloy clad layer coupled to one surface or both surfaces of the 2XXX-series core layer.

Illustration 10 is the rolled composite aerospace product according to any preceding or subsequent illustration, wherein an interliner is positioned between the 2XXX-series core layer and the Al—Cu alloy clad layer, and wherein the interliner is made from a different aluminium alloy than the Al—Cu alloy clad layer.

Illustration 11 is the rolled composite aerospace product according to any preceding or subsequent illustration, wherein the interliner is made of a 1XXX-series aluminium alloy.

Illustration 12 is the rolled composite aerospace product according to any preceding or subsequent illustration, wherein the 2XXX-series alloy of the core layer has a composition of, in wt. %,

| | |
|---|---|
| Cu | 1.9% to 7.0%; |
| Mg | 0.30% to 1.8%; |
| Mn | up to 1.2%; |
| Si | up to 0.40%; |
| Fe | up to 0.40%; |
| Cr | up to 0.35%; |
| Zn | up to 1.0%; |
| Ti | up to 0.15%; |
| Zr | up to 0.25; |
| V | up to 0.25%; |
| Li | up to 2.0%; |
| Ag | up to 0.80%; |
| Ni | up to 2.5%; | and
balance being aluminium and impurities.

Illustration 13 is the rolled composite aerospace product according to any preceding or subsequent illustration, wherein the 2XXX-series core layer is from the 2X24-series alloy.

Illustration 14 is the rolled composite aerospace product according to any preceding or subsequent illustration, wherein at least the 2XXX-series core layer is in a T3, T351, T39, T42, T8 or T851 temper.

Illustration 15 is the rolled composite aerospace product according to any preceding or subsequent illustration, wherein the rolled composite aerospace product has a total thickness of 0.8 mm to 50.8 mm.

Illustration 16 is the rolled composite aerospace product according to any preceding or subsequent illustration, wherein the rolled composite aerospace product is an aerospace structural part.

Illustration 17 is a method of manufacturing a rolled composite aerospace product according to any preceding or subsequent illustration, comprising the steps of:
- providing an ingot of a 2XXX-series aluminium alloy for forming the core layer of the composite aerospace product;
- homogenizing the ingot of the 2XXX-series aluminium alloy at a temperature in the range of 400° C. to 510° C. for at least 2 hours;
- providing an ingot or rolled clad liner of an Al—Cu aluminium alloy for forming an outer clad layer on the 2XXX-series core aluminium alloy;
- optionally homogenizing or preheating the ingot of the Al—Cu aluminium clad alloy forming an outer clad layer at a temperature in the range of at least 400° C. for at least 0.5 hour;
- roll bonding the Al—Cu aluminium alloy clad layer to the 2XXX-series core alloy to form a roll bonded product, and optionally followed by cold rolling;
- solution heat-treating the roll bonded product at a temperature in the range of 450° C. to 510° C.;
- cooling of the solution heat-treated roll bonded product to below 100° C.;
- optionally stretching of the solution heat-treated and cooled roll bonded product; and
- ageing of the cooled roll bonded product.

Illustration 18 is the method according to any preceding or subsequent illustration, wherein the method further comprises forming of the solution heat-treated and cooled roll bonded product, and optionally also being stretched, in a forming process into a predetermined shape product with a uniaxial or a biaxial curvature.

Illustration 19 is the method according to any preceding or subsequent illustration, wherein a forming step is performed after the ageing step.

Illustration 20 is the method according to any preceding or subsequent illustration, wherein the forming step and the ageing step are combined in a forming step at elevated temperature for a time in a range of 1 to 50 hours.

All patents, publications and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A rolled composite aerospace product comprising a 2XXX-series core layer and an Al—Cu alloy clad layer coupled to at least one surface of the 2XXX-series core layer, wherein the Al—Cu alloy clad layer is of an aluminium alloy comprising, in wt. %, 0.2% to 2.8% Cu and 0.2% to 1.5% Mg.

2. The rolled composite aerospace product according to claim 1, wherein the Al—Cu alloy clad layer is of an aluminium alloy comprising, in wt. %, 0.2% to 1.8% Cu.

3. The rolled composite aerospace product according to claim 1, wherein the Al—Cu alloy clad layer comprises an aluminium alloy having a composition of, in wt. %:

| | |
|---|---|
| Cu | 0.02% to 2.8%; |
| Mg | 0.02% to 1.5%; |
| Mn | up to 0.5%; |
| Si | up to 0.5%; |
| Fe | up to 0.4%; |
| Cr | up to 0.25%; |
| V | up to 0.25%; |
| Zr | up to 0.2%; |
| Ag | up to 0.80%; |
| Zn | up to 0.3%; |
| Ti | up to 0.2%; | and
balance unavoidable impurities and aluminium.

4. The rolled composite aerospace product according to claim 3, wherein the Cu-content is in a range of 0.2% to 1.5%.

5. The rolled composite aerospace product according to claim 3, wherein the Mg-content is in a range of 0.20% to 1.2%.

6. The rolled composite aerospace product according to claim 1, wherein the Al—Cu alloy clad layer has a corrosion potential of −710 mV or less.

7. The rolled composite aerospace product according to claim 1, wherein the Al—Cu alloy clad layer is coupled by means of roll bonding to the at least one surface of the 2XXX-series core layer.

8. The rolled composite aerospace product according to claim 1, wherein the Al—Cu alloy clad layer has a thickness in the range of 1% to 20% of the total thickness of the rolled composite aerospace product.

9. The rolled composite aerospace product according to claim 1, consisting of a 2XXX-series core layer and an Al—Cu alloy clad layer coupled to one surface or both surfaces of the 2XXX-series core layer.

10. The rolled composite aerospace product according to claim 1, wherein an interliner is positioned between the 2XXX-series core layer and the Al—Cu alloy clad layer, and wherein the interliner is made from a different aluminium alloy than the Al—Cu alloy clad layer.

11. The rolled composite aerospace product according to claim 10, wherein the interliner is made of a 1 XXX-series aluminium alloy.

12. The rolled composite aerospace product according to claim 1, wherein the 2XXX-series core layer has a composition of, in wt. %,

| | |
|---|---|
| Cu | 1.9% to 7.0%; |
| Mg | 0.30% to 1.8%; |
| Mn | up to 1.2%; |
| Si | up to 0.40%; |
| Fe | up to 0.40%; |
| Cr | up to 0.35%; |
| Zn | up to 1.0%; |
| Ti | up to 0.15%; |
| Zr | up to 0.25; |
| V | up to 0.25%; |
| Li | up to 2.0%; |
| Ag | up to 0.80%; |
| Ni | up to 2.5%; | and
balance being aluminium and impurities.

13. The rolled composite aerospace product according to claim 1, wherein the 2XXX-series core layer is from a 2X24-series alloy.

14. The rolled composite aerospace product according to claim 1, wherein at least the 2XXX-series core layer is in a T3, T351, T39, T42, T8 or T851 temper.

15. The rolled composite aerospace product according to claim 1, wherein the rolled composite aerospace product has a total thickness of 0.8 mm to 50.8 mm.

16. The rolled composite aerospace product according to claim 1, wherein the rolled composite aerospace product is an aerospace structural part.

17. A method of manufacturing a rolled composite aerospace product according to claim 1, comprising the steps of:
providing an ingot of a 2XXX-series aluminium alloy for forming the core layer of the composite aerospace product;
homogenizing the ingot of the 2XXX-series aluminium alloy at a temperature in the range of 400° C. to 510° C. for at least 2 hours;
providing an ingot or rolled clad liner of an Al—Cu aluminium alloy for forming an outer clad layer on the 2XXX-series core aluminium alloy;
optionally homogenizing or preheating the ingot of the Al—Cu aluminium clad alloy forming an outer clad layer at a temperature in the range of at least 400° C. for at least 0.5 hour;
roll bonding the Al—Cu alloy clad layer to the 2XXX-series core alloy to form a roll bonded product, and optionally followed by cold rolling;
solution heat-treating the roll bonded product at a temperature in the range of 450° C. to 510° C.;
cooling of the solution heat-treated roll bonded product to below 100° C.;
optionally stretching of the solution heat-treated and cooled roll bonded product; and
ageing of the cooled roll bonded product.

18. The method according to claim 17, wherein the method further comprises forming of the solution heat-treated and cooled roll bonded product, and optionally also being stretched, in a forming process into a predetermined shape product with a uniaxial or a biaxial curvature.

19. The method according to claim 17, wherein a forming step is performed after the ageing step.

20. The method according to claim 19, wherein the forming step and the ageing step are combined in a forming step at elevated temperature for a time in a range of 1 to 50 hours.

* * * * *